(12) United States Patent
Brooks et al.

(10) Patent No.: US 6,499,015 B2
(45) Date of Patent: *Dec. 24, 2002

(54) VOICE INTERACTION METHOD FOR A COMPUTER GRAPHICAL USER INTERFACE

(75) Inventors: Brian S. Brooks, Lake Worth, FL (US); Keith P. Loring, Coral Springs, FL (US); Maria Milenkovic, Phoenix, AZ (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/372,919

(22) Filed: Aug. 12, 1999

(65) Prior Publication Data

US 2002/0169616 A1 Nov. 14, 2002

(51) Int. Cl.[7] .............................................. G10L 21/00
(52) U.S. Cl. ...................... 704/275; 704/270; 704/256; 704/231; 704/257
(58) Field of Search ................................. 704/270, 275, 704/256, 260, 270.1, 231, 257

(56) References Cited

U.S. PATENT DOCUMENTS

| 5,818,423 | A | * | 10/1998 | Pugliese et al. ............. 345/157 |
| 5,864,819 | A | * | 1/1999 | De Armas et al. .......... 704/275 |
| 5,873,064 | A | * | 2/1999 | De Armas et al. .......... 704/275 |
| 6,012,030 | A | | 1/2000 | French-St. George et al. |
| 6,157,705 | A | * | 12/2000 | Perrone .................... 379/88.01 |

* cited by examiner

Primary Examiner—Vijay Chawan
(74) Attorney, Agent, or Firm—Akerman Senterfitt

(57) ABSTRACT

The present invention enables a computer user to select a function represented via a graphical user interface by speaking command related to the function into audio processing circuitry. A voice recognition program interprets the spoken words to determine the function that is desired for execution. The user may use the cursor to identify an element on the graphical user interface display or speak the name of that element. The computer responds to the identification of the element by displaying a menu of the voice commands associated with that element.

5 Claims, 2 Drawing Sheets

VOICE INTERACTION METHOD FOR A COMPUTER GRAPHICAL USER INTERFACE

BACKGROUND OF THE INVENTION

The present invention relates to voice recognition techniques for personal computers, and more particularly to utilizing such techniques to input commands to be executed by the computer.

Personal computers often are equipped with a "sound card" which is audio processing circuitry mounted on a printed circuit board that plugs into the computer. This enables programs to generate sounds and synthesized speech which are send to speakers connected to the sound card. For example, when the computer presents a warning message to the user that message not only can be displayed on the video monitor, it also can be presented in audio form. Many sound cards also have an input for a microphone which picks-up the user's voice for digitizing by the audio processing circuitry. Sound cards of this type are used for bidirectional audio communication over the Internet.

The conventional way that a user interfaces with a personal computer utilizes the keyboard and a mouse for entering commands in conjunction with a graphical user interface (GUI) which displays icons, words and other graphical elements on the screen of a video monitor. This type of interface is an alternative to typing commands directly into the keyboard. With a GUI, the mouse is employed to manipulate a cursor over an screen display element which corresponds to a function that the user wishes to select. By pressing a button on the mouse, the computer is informed that the present cursor position indicates the item being selected. The software then can correlate the cursor position with the particular display element to determine the user's selection.

Voice recognition software has been developed for use in conjunction with personal computer sound cards. This software enables the user to enter information into the computer by speaking that information. For example, the voice recognition software can be used to enter text into a word processor program instead of typing the text on a keyboard. The software is able to learn speech patterns of a particular user and thereafter recognize words being spoken by that user. Thereafter the digitized audio signals produced by the sound card are interpreted to determine the words being spoken and the text equivalent of the words is entered into the word processor program.

SUMMARY OF THE INVENTION

The present invention enables a computer user to select display elements of a graphical user interface by speaking commands into a microphone connected to the computer.

This is accomplished by a method which involves selecting a display element that is being presented by the graphical user interface on a monitor screen of the computer. The computer then responds to the selection process by displaying a menu of voice commands which may be used to select functions associated with the chosen display element. The next step of the process involves receiving a phrase spoken by the user and employing voice recognition techniques to determine which one of the voice commands was spoken. Thereafter, the computer executes the function designated by the spoken command.

In one specific embodiment of the voice command system, the step of selecting a display element comprises determining a position of a cursor on the monitor screen and determining which display element is located at that position. In another embodiment, the selecting step comprises receiving a second phrase spoken by the user and applying voice recognition techniques to the second phrase in order to determine the display element being designated.

DETAILED DESCRIPTION OF THE INVENTION

Figure 1:
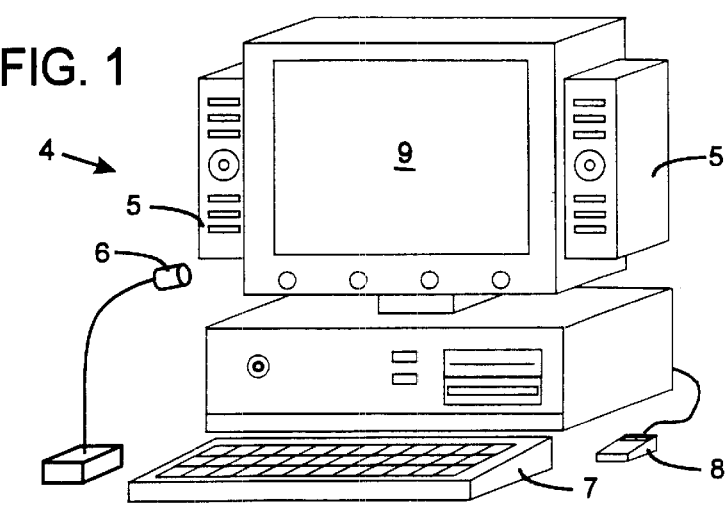
FIG. 1 is an isometric representation of a personal computer.

The present invention is implemented on a commercially available personal computer 4, such as the one shown in FIG. 1, which includes an internal audio input and output circuit, commonly referred to as a "sound card". The audio outputs from the circuit drive a pair of speakers 5 and a microphone 6 is connected the audio input. The sound card converts digital information from the computer into audio signals and digitizes audio signals received from the microphone into data which can be interpreted by the microprocessor and other components of the computer. The personal computer also includes a conventional keyboard 7 and mouse 8 allowing the user to input information in a conventional fashion. A video monitor 9 is provided for the display of information by the computer.

The personal computer executes a conventional voice recognition program which receives the digitized audio produced by the sound card from the microphone signal. That software then provides a digital indication of each word that is spoken by the computer user. The present invention relates to a routine, utilized in conjunction with the voice recognition software, which enables oral interaction with a graphical user interface. Specifically, the user is able to speak the name of an icon or other display element into the computer's microphone to select various programs and functions for the computer to execute.

When the voice recognition software has completed interpreting a spoken command, the result is data which indicate the words spoken by the computer user. At this point the software for the computer determines how to further process that information. First a determination is made whether the user said either the phrase "What can say?" or "What can say to [element]?", where [element] represents the name of an icons or screen display element visible on the monitor screen. If that occurs while the desktop is being displayed, as opposed to a specific application program, a voice command routine for the graphical user interface program is executed.

Figure 3:
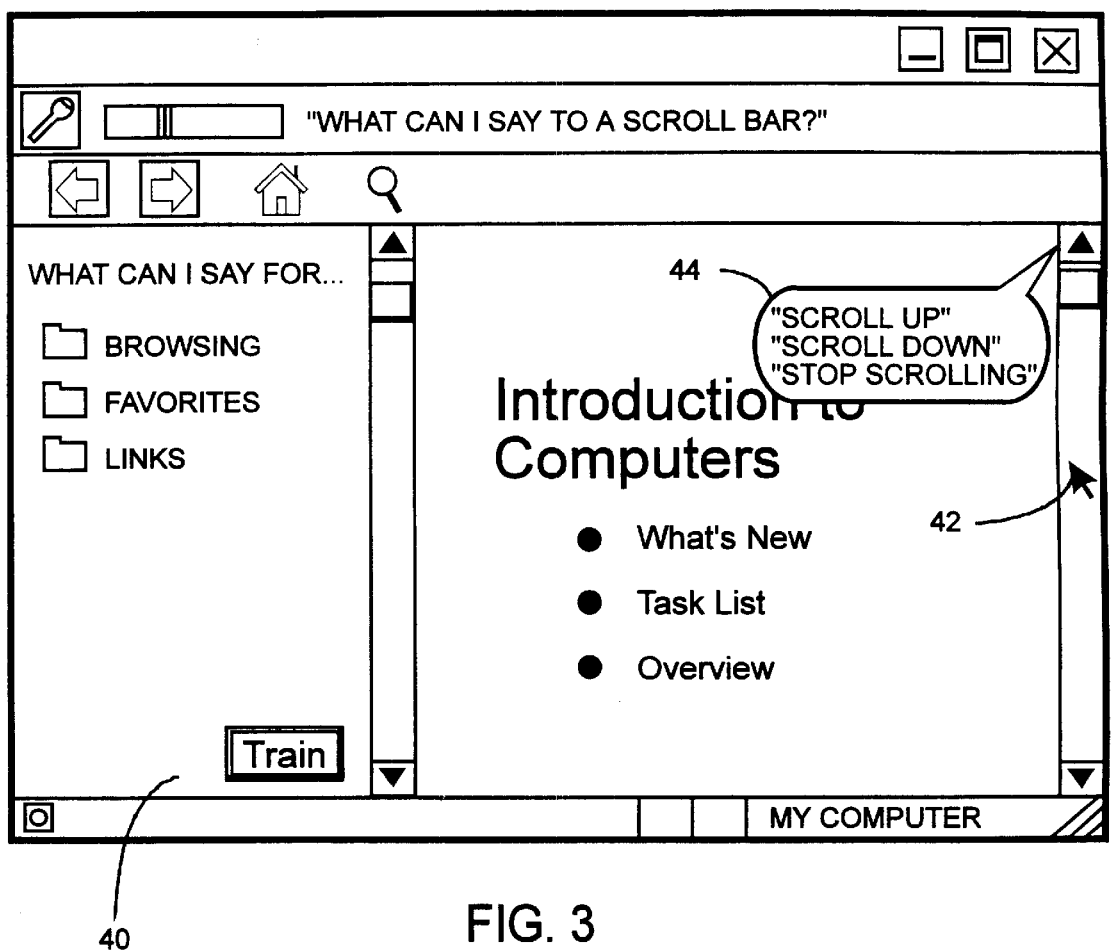
FIG. 3 represents an exemplary graphical user interface image that is displayed on the screen of the computer.
Figure 2:
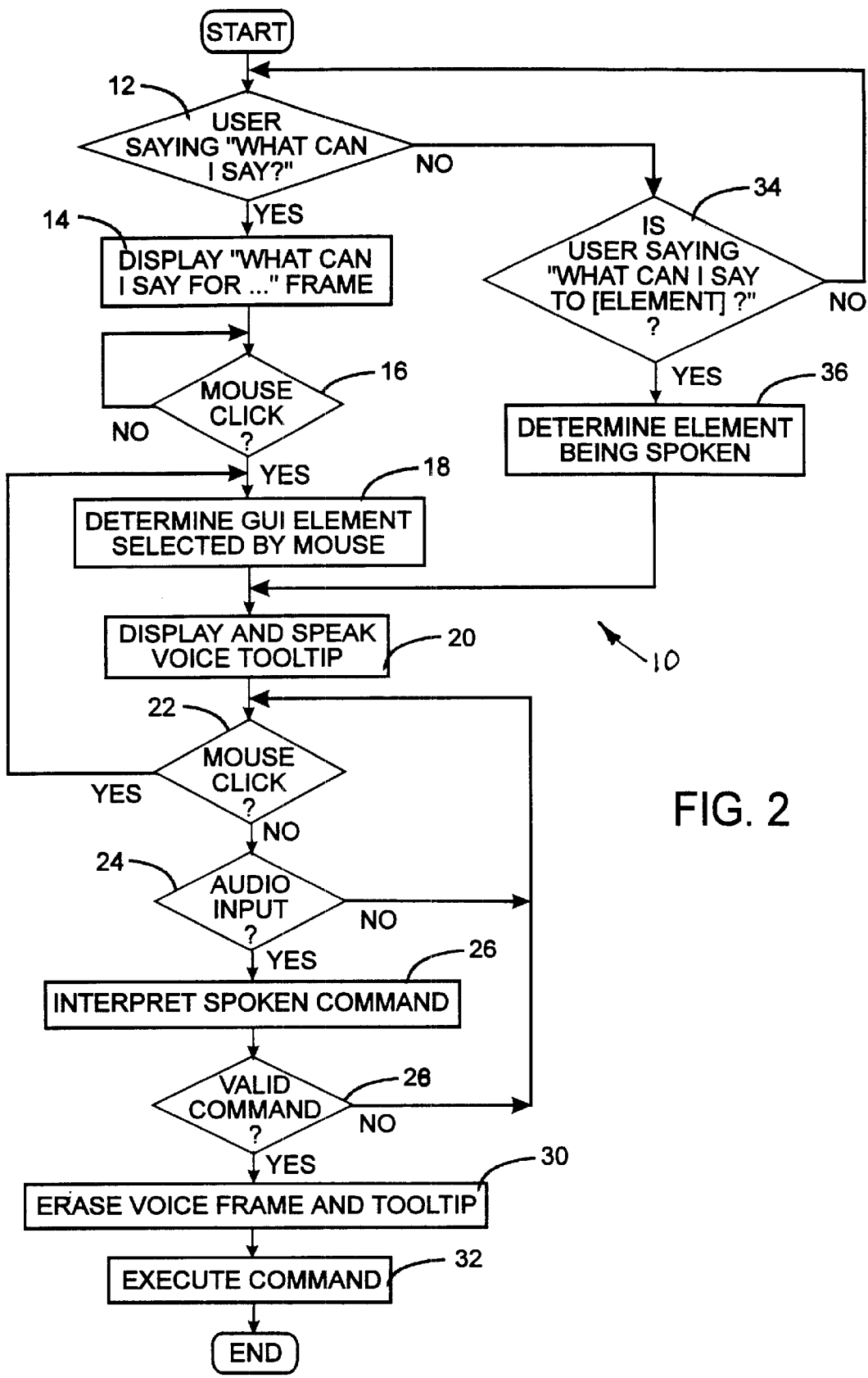
FIG. 2 is a flowchart depicting the method of an computer program for implementing present invention.

The voice command routine 10, represented by the flowchart in FIG. 2, commences at step 12 where the personal computer makes a determination of whether the phrase "What can say?" has been spoken. If so, the program execution advances to step 14 at which a special input command frame 40 is displayed on the left side of the screen of the computer monitor, as depicted in FIG. 3. This input frame includes a list of files containing a number of functions or features which can be selected by the user. This mode of operation allows the user to learn about the different options that can be selected utilizing voice commands. To do so, the user manipulates the computer mouse 8 to place the cursor 42 over the corresponding icon or other graphical user interface element about which the user desires more information. For example, as shown in FIG. 3, the cursor arrow 42 is placed over the scroll bar at the far right edge of the display screen. At that time, the user then presses the push button switch on the computer mouse, an action commonly referred to as "clicking the mouse". In the meantime, the voice command software routine shown in FIG. 2 is waiting at step 16 for a mouse click to occur.

When the mouse is clicked, the microprocessor at step 18 determines the particular element of the graphical user interface which has been selected by the cursor placement, in this case a scroll bar has been chosen. This determination is performed in a manner similar to that utilized with prior graphical user interface programs of personal computers. The voice command routine 10 then responds by creating a tool tip bubble 44 with a leader 46 extending from the selected GUI element. The tool tip bubble 44 contains a menu which provides a textual list of the voice commands which the user may speak in order to select different functions associated with the scroll bar. In this case, the commands are "Scroll Up", "Scroll Down", and "Stop Scrolling". At the same time the voice command routine 10 also sends digitized speech to the audio circuitry so as to produce a digitized voice speaking each of the three commands which emanates from the computer speakers. In this way, the computer user is able to learn the commands associated with a particular icon or other graphical user interface element being displayed on the monitor screen.

At this point, the user may employ the computer mouse to select another graphical user interface element, or the user may speak one of the commands within the menu of the tool tip bubble 44 to execute that command. Therefore, at step 22 the microprocessor within the personal computer 4 checks the input from the mouse 8 to determine if it is being clicked. If so, the user is indicating a different graphical user interface element and the program execution returns to step 18 to determine which element has been selected. Otherwise if the mouse 8 is not being clicked at step 22, the program execution advances to step 24 where a determination is made whether the audio circuitry and the voice recognition program have received another voice command. If not, the program execution loops back to step 22 to check again for a mouse click.

If a new audio command has been received at step 24, the program execution by the personal computer 4 advances to step 26 where the new digital data from the speech recognition program is interpreted to determine whether the command is valid. That is whether the spoken words match those on a list of commands stored in the computer's memory. Such a command may be one of those displayed within the tool tip bubble 44 or another valid command associated with the elements being displayed on the computer monitor screen 9 by the graphical user interface program. Thus at step 28, a determination is made whether a valid command has been received. If that is not the case, the program execution returns to step 22 where the program checks again for another mouse click or audio input.

If a valid spoken command is found at step 28, the program execution advances to step 30 where the voice frame 40 and the tool tip bubble 44 are erased from the monitor display. Then at step 32 the microcomputer executes the spoken command and the routine terminates.

Returning to step 12 of FIG. 2, when the user did not say "What can say?" the program execution branches to step 34 where a determination is made whether the user said "What can say to <element>?". Here <element> is a variable representing the name of one of the icons or GUI elements being displayed on the monitor screen 9. If that phrase is not being spoken the program execution ends. When the user says "What can say to <element>?", the program branches to step 36 at which the element section of the sentence is inspected to determine the part of the graphical user interface display the user has selected. The program then executes step 20 where the tool tip is displayed and the remainder of the routine 10 is executed as described previously.

This the present voice command system enables a user to interface with the computer desktop and other graphical windows using voice commands. The system also allows an unfamiliar user to learn about the different voice commands that can be employed.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A method for selecting functions from a graphical user interface of a computer, the method comprising the steps of:

selecting an activatable control element that is being presented by the graphical user interface on a monitor screen of the computer thereby producing an indication of the activatable control element, wherein the activatable control element can initiate associated functions;

responding to the indication by displaying a menu of voice commands which may be used to select the functions that can be initiated by the activatable control element;

receiving a first phrase spoken by the user;

applying voice recognition techniques to the first phrase to determine which one of the voice commands was spoken by the user; and executing a function indicated by the one of the voice commands.

2. The method as recited in claim 1 wherein the step of selecting an activatable control element comprises determining a position of a cursor on the monitor screen; and determining which activatable control element is located at that position.

3. The method as recited in claim 1 wherein the step of selecting an activatable control element comprises receiving a second phrase spoken by the user; and applying voice recognition techniques to the second phrase to determine an activatable control element that is indicated by the second phrase.

4. A method for selecting functions from a graphical user interface of a computer, the method comprising the steps of:

determining a position of a cursor on the monitor screen and determining which activatable control element of a graphical user interface is located at that position to produce an indication of that activatable control element, wherein the activatable control element can initiate associated functions;

responding to the indication by displaying a menu of voice commands which may be used to select the functions that can be initiated by the activatable control element;

receiving a first phrase spoken by the user;

applying voice recognition techniques to the first phrase to determine which one of the voice commands was spoken by the user; and executing a function indicated by the one of the voice commands.

5. A method for selecting functions from a graphical user interface of a computer, the method comprising the steps of:

receiving a first phrase spoken by the user;

applying voice recognition techniques to the first phrase to determine an activatable control element that is indicated by the first phrase and produce an indication of that activatable control element, wherein the activatable control element can initiate associated functions;

responding to the indication by displaying a menu of voice commands which may be used to select the functions that can be initiated by the activatable control element;

receiving a first phrase spoken by the user;

applying voice recognition techniques to the first phrase to determine which one of the voice commands was spoken by the user; and executing a function indicated by the one of the voice commands.

* * * * *